United States Patent Office 3,431,301
Patented Mar. 4, 1969

3,431,301
PROCESS FOR PRODUCING METHYLHYDRAZINE DERIVATIVES
Antonino Focella, Clifton, Harvey Gurien, Newark, and Albert Israel Rachlin, Verona, N.J., assignors to Hoffmann-La Roche Inc., Nutley, N.J., a corporation of New Jersey
No Drawing. Filed Mar. 24, 1966, Ser. No. 536,962
U.S. Cl. 260—558
Int. Cl. C07c 109/02, 103/22
9 Claims

ABSTRACT OF THE DISCLOSURE 1-methyl-2-[4-(alkylcarbamyl)benzyl]hydrazine hydrohalide salts, useful as cytastatic agents are prepared by reacting a 4-(alkylcarbamyl)benzaldehyde with methylhydrazine, hydrogenating the resulting hydrazone, and forming the hydrogen halide salt of the corresponding hydrazine. All the steps are conducted in the presence of a reaction solvent of the formula

wherein $R^1$, $R^2$ and $R^3$ are as hereinafter described.

---

This invention is concerned with a process for producing certain methylhydrazines. More particularly, this invention relates to a method for producing 1-methyl-2-[4-(alkylcarbamyl)benzyl]hydrazine hydrohalide salts having the formula:

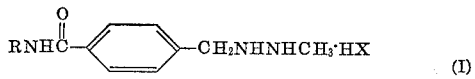

wherein R is lower alkyl, i.e., alkyl of from 1 to 6 carbons, such as methyl, ethyl, propyl, isopropyl, butyl, sec.-butyl, tert.-butyl, and the like; and X is halogen, especially bromine and chlorine, and is preferably chlorine.

These compounds have been produced in the past by the reaction of a 4-(alkylcarbamyl)benzaldehyde with methylhydrazine to produce a methyl-[4-(alkylcarbamyl)benzylidine]hydrazone. The hydrazone, after isolation from the reaction mixture, was hydrogenated in aqueous alcoholic solvent to the corresponding hydrazine. The insoluble hydrochloride salt was then produced by the addition of alcoholic hydrogen halide and recovered by filtration from the reaction mixture.

It has now been discovered by this invention that if the methylhydrazine salts of Formula I are crystallized from certain N,N-disubstituted amides, as hereinafter defined, the salt is obtained in improved purity, as is evidenced by the formation of an aqueous solution which remains clear for extended periods of time. The improved purity is also shown by thin layer chromatography. As a result, the hydrohalide salt has significantly improved stability and can be stored for extended periods of time at ambient conditions with no detectable degradation. In addition, the methylhydrazines have substantially reduced acute toxicity levels. Finally, the hydrogen halide salts are recovered in the form of relatively large crystalline particles rather than as a powder, thus facilitating dry-charging to ampules.

The N,N-disubstituted amides which are employed in accordance with this invention are those represented by the formula:

wherein each of $R^1$ and $R^2$, when taken alone, is lower alkyl; $R^3$, when taken alone, is hydrogen or lower alkyl; $R^1$ and $R^2$, when taken together, form a lower alkylene group of up to about 6 carbon atoms, which when taken with the acylimido group ($>COR^3$), forms a 5- to 6-membered heterocyclic ring; and $R^2$ and $R^3$, when taken together, form a lower alkylene radical, which when taken together, form a lower alkylene radical, which when taken with the alkylcarbamylene group (—$NR^1CO$—)

forms a 5- to 6-membered heterocyclic ring.

Illustrative examples of these amides include dimethylformamide, dimethylacetamide, dimethylpropionamide, diethylformamide, dipropylformamide, N-methylpyrrolidone, and N-acetylpiperidine. Preferred are the acyclic amides, and especially preferred are dimethylformamide and dimethylacetamide.

Although the methylhydrazine salts of Formula I can be produced by conducting the above-described process in any reaction medium, it is preferred that the entire sequence be conducted in an N,N-disubstituted amide of Formula II above. It is further preferred that the entire process be effected without isolation of intermediate products, thereby avoiding the introduction of impurities which have a tendency to adversely affect the stability of the ultimate product. The use of an amide as the reaction solvent is of particular advantage in the hydrogenation step, where it promotes a considerably faster reaction rate. As a result, the necessity for periodic analysis to determine whether the hydrogenation reaction is complete is eliminated, thereby precluding another source for the introduction of impurities.

The reaction conditions are not narrowly critical. It is preferred, however, that the initial condensation of aldehyde with methylhydrazine be conducted at an elevated temperature, for example, 50–200° C. It is especially preferred to conduct this condensation under reflux conditions, with removal of the water of reaction to drive the condensation to completion.

The hydrogenation may be conducted under any suitable conditions, although a temperature of about room temperature and pressure of from about 1 to about 10 atmospheres are preferred. Any suitable hydrogenation catalyst may be employed, including noble metal catalysts, such as palladium, platinum, rhodium, or well as Raney nickel, and the like. A preferred catalyst comprises palladium supported on charcoal.

Although any of the aforementioned amides may be employed as the reaction medium for the various steps, dimethylformamide and dimethylacetamide are preferred, with dimethylformamide being especially preferred. Recrystallization of the final hydrogenation salt is not a necessary, but is a highly preferred, procedure. When recrystallization is employed, however, it is preferred that the hydrazine salt be recrystallized from dimethylacetamide, because traces of this particular compound are acceptable in pharmaceutical formulations. Thus, when dimethylacetamide is employed as the recrystallization medium, particular care need not be taken to ensure complete removal of the solvent.

To ensure high purity of the hydrazine hydrohalide salt, it is preferred that at least the final crystallization be conducted under an inert, e.g., nitrogen or argon, atmosphere. It is also desirable to purge the amide solvent of oxygen and other potential oxidants, as by bubbling nitrogen through the amide, prior to use.

The following examples are illustrative.

EXAMPLE 1

To a two-liter, three-necked flask equipped with a mechanical stirrer, a thermometer, and gas inlet and outlet tubes are charged 1000 milliliters of dimethyl.

acetamide. After purging the solvent with a stream of dry nitrogen while heating to 110–114° C., 100 grams of crude 1 - methyl - 2 - [4 - (isopropylcarbamyl)benzyl]hydrazine hydrochloride was added. After clarifying by filtration, the resulting solution was stirred while cooling under a nitrogen atmosphere and then allowed to stand overnight. After cooling for two hours in an ice bath and filtering from the resulting mixture, the filter cake was washed 3 times with acetone. The purified product, after drying over phosphorous pentoxide at 34–38° C. for 48 hours, weighed 86.5 grams.

EXAMPLE 2

To a five-liter, three-necked flask equipped with a mechanical stirrer, a thermometer, and reflux condenser was charged 3.2 liters of dimethylformamide and 467 grams of 4-(N-isopropylcarbamyl)benzaldehyde. After addition of a solution of 117 grams of methylhydrazine in 230 milliliters of dimethylformamide, the resulting mixture was heated to 75° C. and maintained at this temperature for one hour. After an additional hour at 105° C. one liter of dimethylformamide was distilled out of the reaction flask. The resulting reaction mixture was cooled to room temperature, 26.5 grams of a 5 percent palladium-on-charcoal catalyst was added and the mixture was hydrogenated at 4 atmospheres for a period of 2.5 hours, at which time hydrogen uptake was complete. After filtering to remove the catalyst, a solution of 90 grams of hydrogen chloride in 230 milliliters of dry dimethylformamide was added with stirring to the filtrate. The resulting reaction mixture was held at room temperature for 16 hours and then for an additional two hours at 5° C. The resulting solid was filtered, washed with 100 milliliters of dry dimethylformamide, and then reslurried in 2 liters of dry dimethylformamide. The resulting mixture was heated at 70° C. for 30 minutes and cooled to 5° C. and stirred at this temperature for 30 minutes. The solid 1-methyl-2-[4 - (isopropylcarbamyl)benzyl]hydrazine hydrochloride, after filtering from the mixture, washing with 100 milliliters of dimethylformamide and then with 200 milliliters of acetone, and drying, weighed 539.5 grams.

A 500-gram portion of the product was added to 5 liters of dimethylacetamide, which had been purged with nitrogen, at 115° C. and under a nitrogen atmosphere. The resulting solution, after clarifying by filtration, was cooled, with stirring, to room temperature. After standing overnight, the mixture was cooled to 5° C., held for two hours at this temperature and filtered. The filter cake was washed with 200 milliliters of cold dimethylacetamide and then with two 200-milliliter portions of acetone. After drying, the resulting 1-methyl-2-[4-(isopropylcarbamyl)benzyl]hydrazine hydrochloride weighed 402.6 grams.

We claim:

1. The process for purifying an impure methylhydrazine of the formula:

(I)

wherein R is lower alkyl and X is selected from the group consisting of chlorine and bromine, which comprises crystallizing said methylhydrazine salt from a normally liquid amide of the formula:

(II)

wherein each of $R^1$ and $R^2$ alone is lower alkyl of 1–3 carbon atoms; $R^3$, when taken alone, is a member selected from the group consisting of hydrogen and lower alkyl of 1–3 carbon atoms; $R^1$ and $R^2$, when taken together, are pentamethylene and $R^2$ and $R^3$, when taken together, are trimethylene, by dissolving said impure methylhydrazine salt in said amide at an elevated temperature, thereafter cooling the solution to effect precipitation of said methylhydrazine salt, and thereafter separating said solid methylhydrazine salt from said liquid amide.

2. The process as claimed in claim 1 wherein said amide is dimethylformamide.

3. The process as claimed in claim 1 wherein said amide is dimethylacetamide.

4. The process as claimed in claim 1 wherein said methylhydrazine is 1-methyl-2-[4-(isopropylcarbamyl)benzyl]hydrazine hydrochloride.

5. In a process for producing a 1-methyl-2-[4-(alkylcarbamyl)benzyl]hydrazine hydrohalide of the formula:

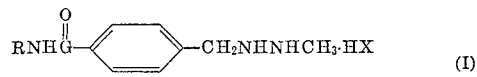
(I)

wherein R is lower alkyl and X is selected from the group consisting of chlorine and bromine, comprising
   (a) reacting a 4-(alkylcarbamyl)benzaldehyde with methylhydrazine at an elevated temperature;
   (b) hydrogenating the resulting hydrazone in the presence of a hydrogenation catalyst; and
   (c) forming the hydrogen halide salt of the corresponding hydrazine the improvement of conducting steps (a) to (c) in, as a reaction solvent, an amide of the formula:

(II)

wherein each of $R^1$ and $R^2$, when taken alone, is lower alkyl of 1–3 carbon atoms; $R^3$, when taken alone, is a member selected from the group consisting of hydrogen and lower alkyl of 1–3 carbon atoms; $R^1$ and $R^2$, when taken together are pentamethylene; and $R^2$ and $R^3$, when taken together are trimethylene.

6. The process as claimed in claim 5 wherein said amide is dimethylformamide.

7. The process as claimed in claim 5 wherein said amide is dimethylacetamide.

8. The process as claimed in claim 5 wherein said product is 1-methyl-2-[4-(isopropylcarbamyl)benzyl]hydrazine hydrochloride.

9. The process as claimed in claim 8 wherein steps (a) to (c) are conducted in dimethylformamide as a solvent and the product hydrochloride salt is recrystallized from dimethylacetamide.

References Cited

Derwents Farmdoc., pp. 511–550, issued Mar. 19, 1961.

HENRY R. JILES, *Primary Examiner.*

H. I. MOATZ, *Assistant Examiner.*

U.S. Cl. X.R.

260—999

UNITED STATES PATENT OFFICE
CERTIFICATE OF CORRECTION

Patent No. 3,431,301                                            March 4, 1969

Antonino Focella et al.

It is certified that error appears in the above identified patent and that said Letters Patent are hereby corrected as shown below:

Column 1, line 31, "(alkylcarbamayl," should read -- (alkylcarbamyl) --. Column 2, line 4, "( >COR³)" should read -- ( >NCOR³) --; lines 7 and 8, cancel "together, form a lower alkylene radical, which when taken". Column 4, line 23, that portion of the formula reading:

same column 4, line 60, "Mar. 19, 1961" should read -- Mar. 19, 1964 --.

Signed and sealed this 7th day of April 1970.

(SEAL)
Attest:

Edward M. Fletcher, Jr.                                     WILLIAM E. SCHUYLER, JR.
Attesting Officer                                                     Commissioner of Patents